United States Patent
Mayle et al.

[19]

[11] Patent Number: 6,110,311
[45] Date of Patent: Aug. 29, 2000

[54] ADJUSTABLE ROOF MEMBRANE COMPONENT AND METHOD

[76] Inventors: Robert L. Mayle, 2047 S. Hyde Rd., Port Clinton, Ohio 42452; Steven Mayle, 2274 Augusta Dr., Fremont, Ohio 43420

[21] Appl. No.: 09/222,743

[22] Filed: Dec. 30, 1998

[51] Int. Cl.$^7$ .............................. B32B 31/20; E04D 1/00
[52] U.S. Cl. .................. 156/189; 156/274.4; 156/275.1; 156/308.2; 156/308.4; 52/58
[58] Field of Search .................... 156/71, 189, 191, 156/192, 245, 273.7, 274.4, 275.1, 308.2, 308.4; 52/58, 60; 264/449, 451

[56] References Cited

U.S. PATENT DOCUMENTS

| | | | |
|---|---|---|---|
| 3,763,605 | 10/1973 | Freeman | 52/58 |
| 4,112,632 | 9/1978 | Simpson | 52/11 |
| 4,603,517 | 8/1986 | Lyons, Jr. | 52/60 |
| 4,625,469 | 12/1986 | Gentry et al. | 52/60 |
| 4,635,409 | 1/1987 | Vandemore | 52/60 |
| 4,652,321 | 3/1987 | Greko | 156/308.4 |
| 4,671,036 | 6/1987 | Sullivan | 52/518 |
| 4,799,986 | 1/1989 | Janni | 156/196 |
| 4,860,514 | 8/1989 | Kelly | 52/410 |
| 4,870,796 | 10/1989 | Hart et al. | 52/409 |
| 4,872,296 | 10/1989 | Janni | 52/58 |
| 5,027,572 | 7/1991 | Purcell et al. | 52/309.9 |
| 5,077,943 | 1/1992 | McGady | 52/58 |
| 5,218,793 | 6/1993 | Ball | 52/62 |
| 5,365,709 | 11/1994 | Lassiter | 52/408 |
| 5,452,553 | 9/1995 | Clapp et al. | 52/408 |
| 5,706,610 | 1/1998 | Mayle | 52/60 |

OTHER PUBLICATIONS

GenFlex Product Details for Field Fabricated Outside Corner, Dec. 1994.

Technical product literature from Duro–Last, Inc., Dec. 1994.

*Primary Examiner*—Jeff H. Aftergut
*Assistant Examiner*—Michael A Tolin
*Attorney, Agent, or Firm*—Standley & Gilcrest LLP

[57] ABSTRACT

An adjustable stack flashing fitment for use with polymer-coated roof membranes to cover areas around vertical protrusions in a roof, is disclosed. A method for making the fitment is also disclosed.

1 Claim, 4 Drawing Sheets

ADJUSTABLE ROOF MEMBRANE COMPONENT AND METHOD

BACKGROUND AND SUMMARY OF THE INVENTION

The invention generally relates to roof-covering membranes, and more particularly relates to a universal, adjustable fitment for use with roof-covering membranes.

Polymer coated membranes are commonly used to cover generally flat roofs. The membrane is custom designed for the particular roof on which it is to be used. The roof measurements are provided to the factory which creates a unitary membrane from separate pieces which have been heat welded together.

There are frequently items protruding from the surface of the roof, such as vents, ductwork, air conditioning units, and the like. The size and location of these items must also be provided to the factory so that accommodations can be made for them in the membrane.

Providing a water-tight seal around these protrusions presents a number of problems. Therefore, it is desirable to provide a universal fitment which provides a smooth membrane transition to the shape or angle of the underlying protrusion.

The present invention provides a universal fitment that is useful with roof membranes to cover exposed roof areas around a vertical protrusion in a roof.

DESCRIPTION OF THE INVENTION

Figure 1:
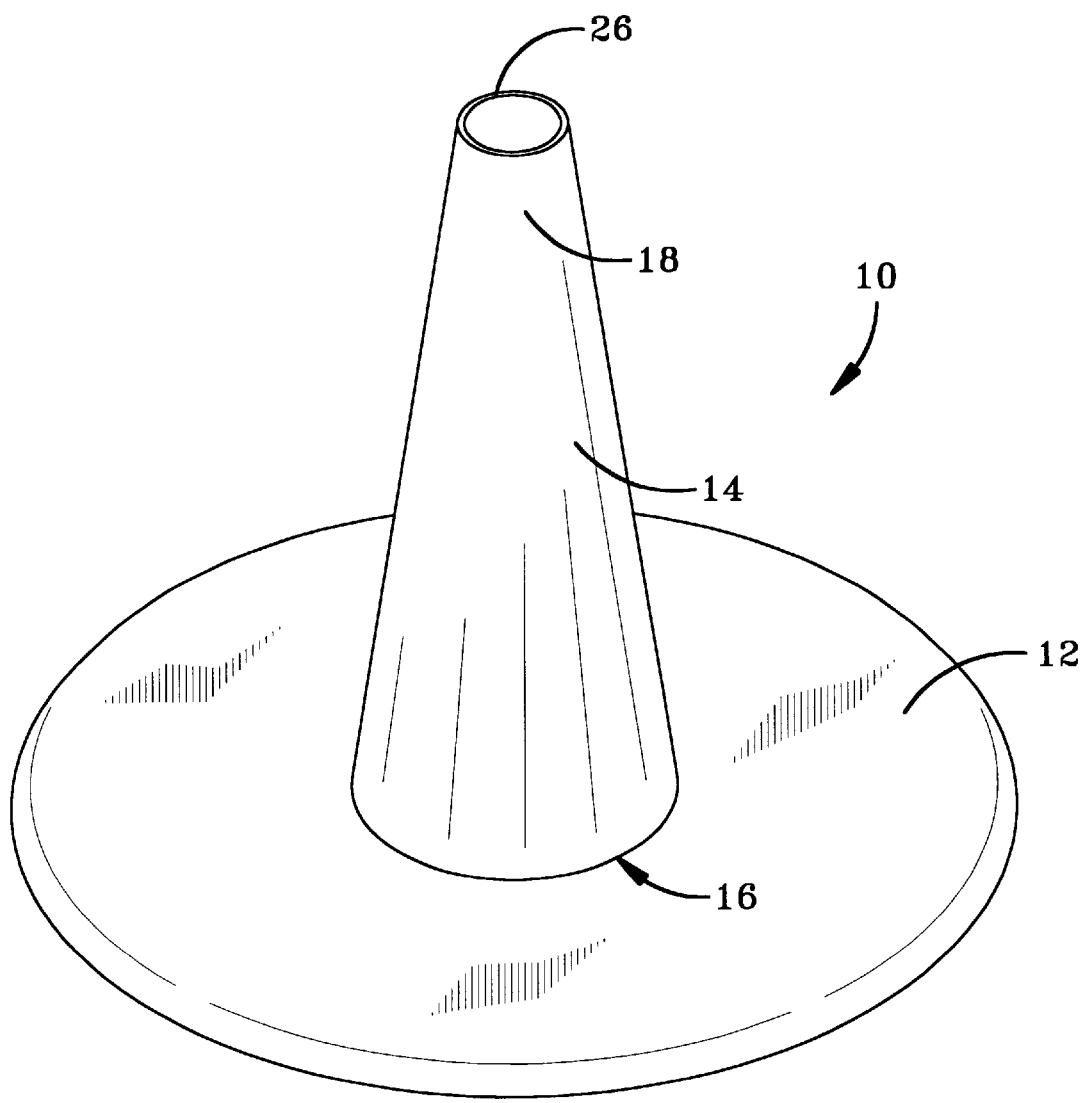
FIG. 1 is a perspective view of a preferred embodiment of the present invention.
Figure 2:
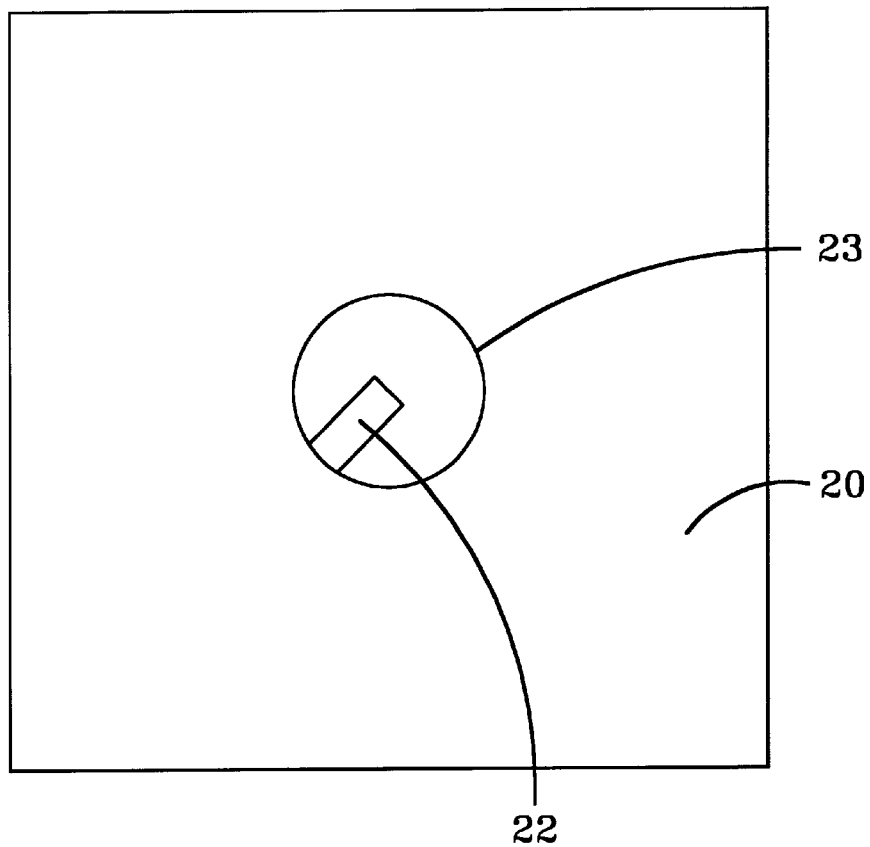
FIG. 2 is a plan view of a preferred embodiment of a base die useful in a preferred method of the present invention.
Figure 3:
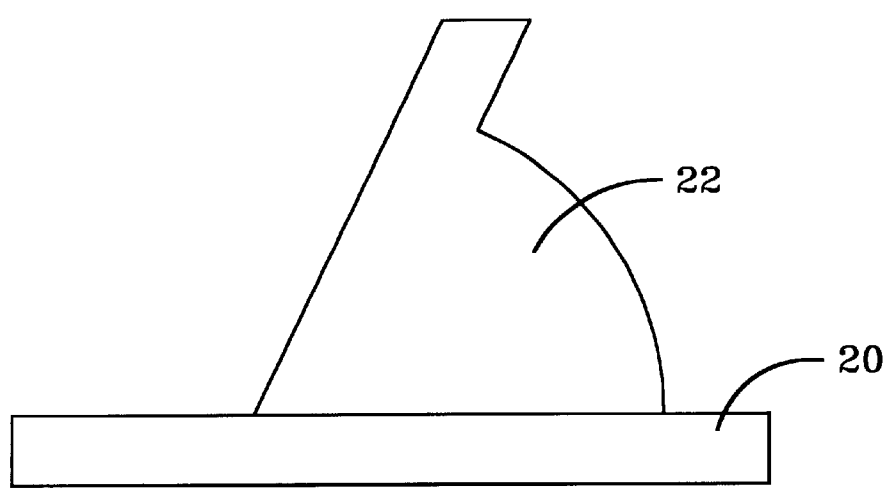
FIG. 3 is an elevational view of the base die of FIG. 2.
Figure 4:
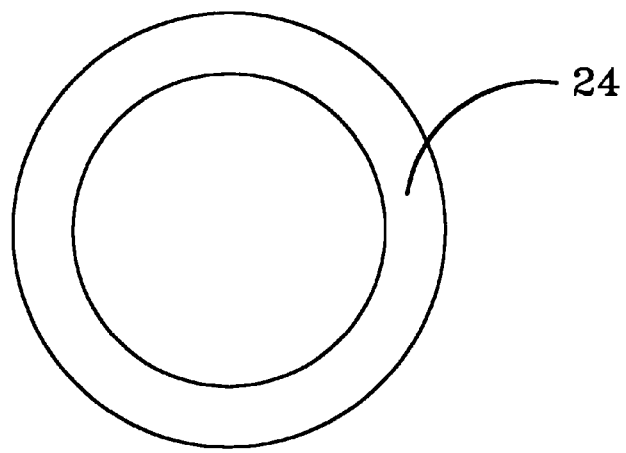
FIG. 4 is a plan view of a preferred embodiment of a ring die useful in a preferred method of the present invention.
Figure 5:
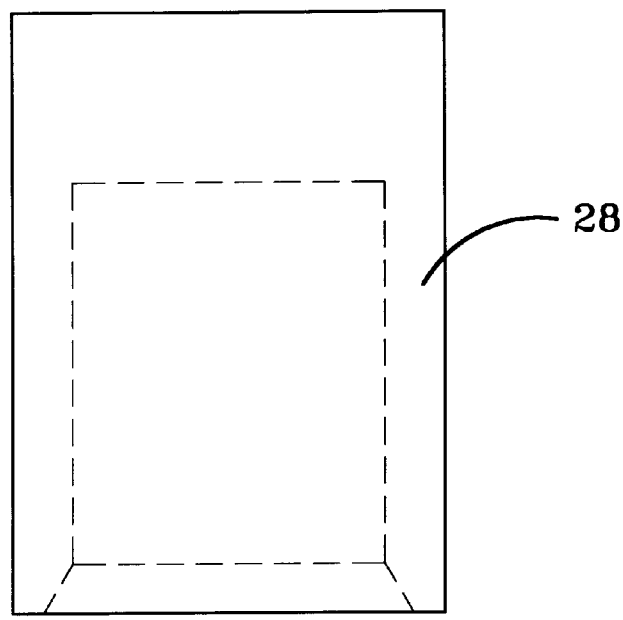
FIG. 5 is an elevation view of a preferred embodiment of a plunger die useful in a preferred method of the present invention.

The present invention involves a universal fitment 10 for use with polymer-coated roof membranes to keep rain, snow, and other elements from leaking through the roof around vertical protrusions in the roof. The preferred fitment/component 10 includes a base portion 12 which may be circular in shape, and a generally conical shaped, preferably adjustable, stack flashing portion 14. Other shapes and sizes would also work well in particular uses of the invention.

The base portion 12 preferably incorporates an annular shaped opening 16 in its center. In use the annular opening fits over a vertical roof protrusion, such as a vent stack. The stack flashing portion 14 is preferably secured to the base portion 12 at the factory, in a leakproof manner. An upper portion 18 of the stack flashing may be left in an "open" condition to allow for field welding around a given vent stack pipe. If the upper portion is welded in a "closed" condition at the factory it may not fit the given vent stack pipe diameter when installed in the field.

The base portion and the stack flashing portion are preferably made from the same material as the overall roof membrane material. This material is preferably a thermoplastic material, such as PVC, and is well known to those of ordinary skill in the art.

The present invention may be formed with the following unique process. First, prepare a base portion by cutting to a desired shape and cutting an opening in the base portion. Then place the base portion opening over a base die 20 extension 22. Then prepare a stack flashing portion of membrane material, preferably by cutting to a desired shape that can be wrapped around the base die extension, in a vertical plane, to create a conical shape from the stack flashing portion.

Next, place a welding ring die 24 over the top 26 of the conical shaped stack flashing portion, until it contacts and surrounds the base die extension 22. Then place a plunger die 28 over the top of the stack flashing portion and onto the welding ring die, pressing the ring die firmly down onto the base die and compressing the stack flashing portion 14 onto the base membrane portion 12.

A dielectric press is then placed onto the plunger die and a dielectric weld charge is applied through the welding ring die to cause the stack flashing portion and the base membrane portion to be secured together in a heat bonded manner around the perimeter of the base die extension and as far up the stack flashing portion as desired. The dies may then be removed and the completed roof membrane component is ready to be delivered to a site for installation. The dies may be made of steel or other suitable material and may be made in the shapes as shown in the FIGS. 2–5 or in other suitable shapes.

Figure 6:
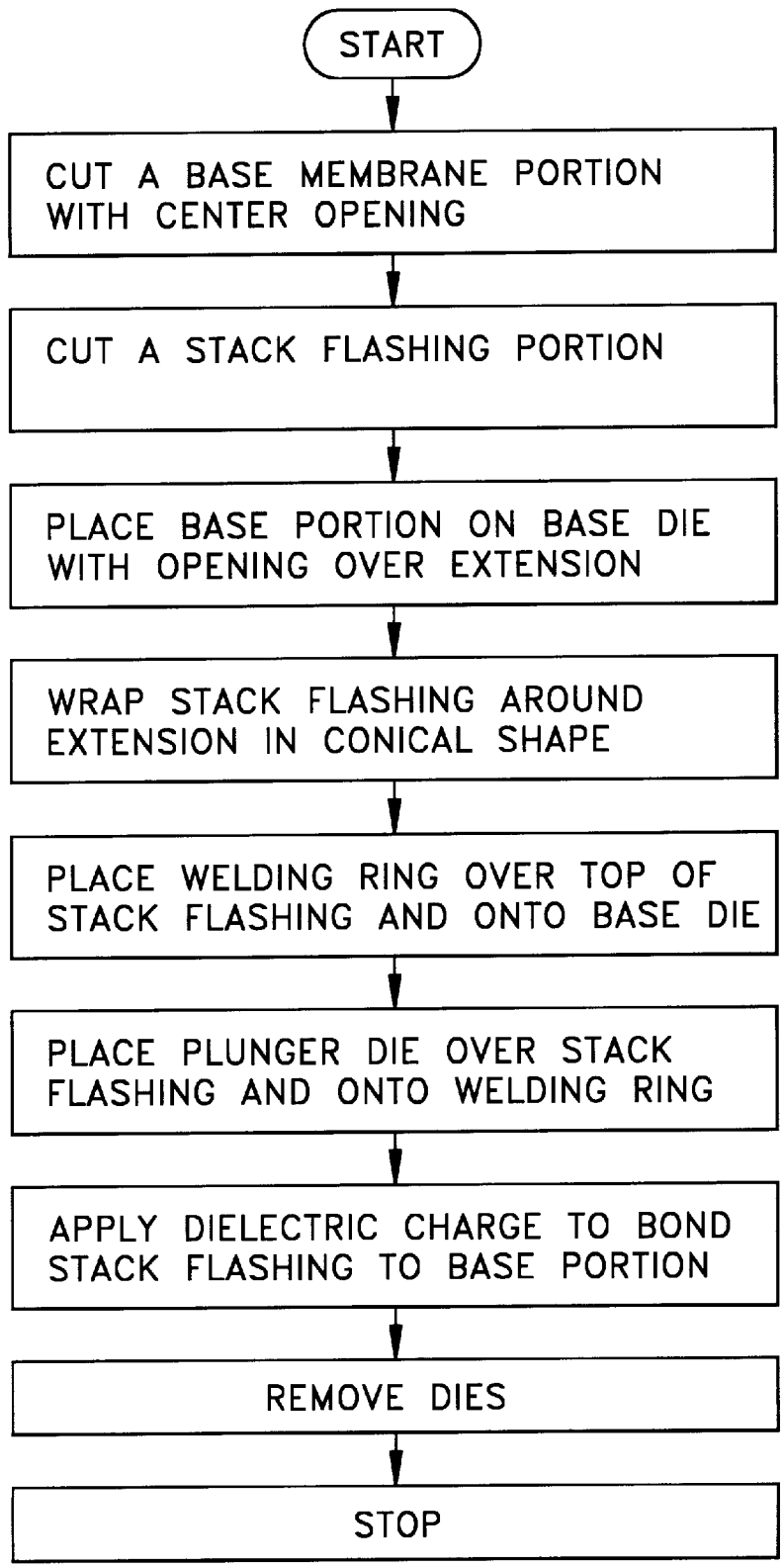
FIG. 6 is a flow chart of a preferred process of the present invention.

The upper portion of the stack flashing membrane may be left unwelded, a distance approximately one-third down from its peak, for later field welding to fit a given vent stack. FIG. 1 shows a completed component of the present invention. FIGS. 2–5 show the dies that may be used in making the component in FIG. 1. FIG. 6 shows a flow chart of the preferred steps of making the component.

By using the method of the present invention only one factory weld step may be necessary to prepare the component for field installation. Once in the field, the installer merely places the component over a vent stack and field welds the upper portion of the component to a tight fit around the vent stack, after securing the base portion to the overall roof membrane. It is also preferred to have lapped material engagement and not merely butt engagement where the lower portion of the stack flashing portion contacts the base portion. The lapped engagement is made possible by designing the diameter 23 of the extension 22 to be somewhat greater than the center opening of the base portion, which causes the perimeter of the center opening of the base portion to slide up the extension 22 when the base portion is placed over the extension. The stack flashing portion then laps or surrounds the base portion at the extension 22.

The scope of the invention is not to be considered limited by the above disclosure, and modifications are possible without departing from the spirit of the invention as evidenced by the following claims.

What is claimed is:

1. A method for making a roof membrane component, comprising:

providing a base portion having a center opening;

providing a stack flashing portion adapted to be secured to said base portion;

providing a base die having an extension extending from said base die;

placing said base portion opening over said extension;

wrapping said stack flashing portion around said extension;

placing a ring die over said stack flashing portion and onto said base portion;

placing a plunger die over said stack flashing portion and onto said ring die thereby compressing said stack flashing portion at its lower end onto said base portion; and applying a dielectric charge simultaneously to said ring die and a portion of said plunger die to thermally bond said base portion to said lower end of said stack flashing portion, and to bond at least a partial length of said stacked flashing portion to itself.

* * * * *